(12) United States Patent
    Moran et al.

(10) Patent No.: US 10,976,904 B2
(45) Date of Patent: Apr. 13, 2021

(54) GRAPHICAL CHATBOT INTERFACE FACILITATING USER-CHATBOT INTERACTION

(71) Applicant: INTERNATIONAL BUSINESS MACHINES CORPORATION, Armonk, NY (US)

(72) Inventors: John F. Moran, Greensboro, NC (US); Michael Bender, Rye Brook, NY (US); Todd P. Seager, Orem, UT (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 80 days.

(21) Appl. No.: 16/404,894

(22) Filed: May 7, 2019

(65) Prior Publication Data
    US 2020/0356237 A1    Nov. 12, 2020

(51) Int. Cl.
    *G06F 3/048* (2013.01)
    *G06N 20/00* (2019.01)
    *G06F 3/0484* (2013.01)
    *H04L 12/58* (2006.01)
    *G06N 5/02* (2006.01)

(52) U.S. Cl.
    CPC .......... *G06F 3/04842* (2013.01); *G06N 5/02* (2013.01); *G06N 20/00* (2019.01); *H04L 51/02* (2013.01)

(58) Field of Classification Search
    CPC .......... G06F 3/048; G06N 20/00; G06N 5/02; H04L 51/02
    See application file for complete search history.

(56) References Cited

U.S. PATENT DOCUMENTS

| | | | |
|---|---|---|---|
| 7,958,066 B2 | 6/2011 | Pinckney et al. | |
| 9,223,461 B1* | 12/2015 | Brown | G06F 3/04883 |
| 9,542,496 B2 | 1/2017 | Dettman et al. | |
| 9,754,308 B2 | 9/2017 | Pinckney et al. | |
| 10,484,313 B1* | 11/2019 | Sutherland | G06F 3/0488 |
| 2008/0071771 A1* | 3/2008 | Venkataraman | G06F 16/78 |

(Continued)

OTHER PUBLICATIONS

Mel et al., "The NIST Definition of Cloud Computing," National Institute of Standards and Technology, Information Technology Laboratory, Special Publication 800-145, Sep. 2011 (pp. 1-7).

*Primary Examiner* — Hugo Molina
(74) *Attorney, Agent, or Firm* — Michael A. Petrocelli, Esq.; Kevin P. Radigan, Esq.; Heslin Rothenberg Farley & Mesiti P.C.

(57) ABSTRACT

Interaction with a chatbot of a computer system is facilitated by receiving, by the chatbot, a request from a user of the chatbot, where the request establishes a user-chatbot interaction. Based at least in part on the request, a plurality of predicted chatbot paths are generated, forming a hierarchy of predicted chatbot content for the user-chatbot interaction. A graphical chatbot interface including, at least in part, the hierarchy of predicted chatbot content for the user-chatbot interaction is provided for display on an electronic device, and a selection by the user of one predicted chatbot path of the graphical chatbot interface is received, via the electronic device, as part of the user-chatbot interaction, where the providing of the graphical chatbot interface facilitates user interaction with the chatbot along the selected predicted chatbot path.

20 Claims, 11 Drawing Sheets

(56) References Cited

U.S. PATENT DOCUMENTS

| | | |
|---|---|---|
| 2009/0100160 A1 | 4/2009 | Bowerman |
| 2011/0289076 A1 | 11/2011 | Boyle et al. |
| 2012/0191629 A1 | 7/2012 | Shae et al. |
| 2014/0164296 A1 | 6/2014 | Duan |
| 2014/0236934 A1 | 8/2014 | Boyle et al. |
| 2017/0091777 A1 | 3/2017 | Bender et al. |
| 2017/0351962 A1 | 12/2017 | Appel et al. |
| 2018/0295071 A1 | 10/2018 | Jain et al. |
| 2019/0243899 A1* | 8/2019 | Yi ................... H04M 3/4938 |
| 2019/0260703 A1* | 8/2019 | Moskowitz ............ G06F 3/011 |
| 2020/0021488 A1* | 1/2020 | Joshi ................. G06F 40/30 |
| 2020/0211709 A1* | 7/2020 | Devesa ................ G06F 16/27 |

* cited by examiner

RECEIVE A REQUEST FROM A USER TO THE CHATBOT, THE REQUEST ESTABLISHING A USER-CHATBOT INTERACTION ~600

BASED AT LEAST IN PART ON THE REQUEST, GENERATE A PLURALITY OF PREDICTED CHATBOT PATHS FORMING A HIERARCHY OF PREDICTED CHATBOT CONTENT FOR THE USER-CHATBOT INTERACTION ~602

PROVIDE FOR DISPLAY ON AN ELECTRONIC DEVICE A GRAPHICAL CHATBOT INTERFACE WITH, AT LEAST IN PART, THE HIERARCHY OF PREDICTED CHATBOT CONTENT FOR THE USER-CHATBOT INTERACTION ~604

RECEIVE, VIA THE ELECTRONIC DEVICE, A SELECTION BY THE USER OF ONE PREDICTED CHATBOT PATH OF THE GRAPHICAL CHATBOT INTERFACE AS PART OF THE USER-CHATBOT INTERACTION, WHERE THE INTERFACE FACILITATES THE USER INTERACTION WITH THE CHATBOT ~606

WHERE THE REQUEST IS AN AUDIO REQUEST TO THE CHATBOT OR A TEXTUAL REQUEST TO THE CHATBOT ~608

WHERE THE ELECTRONIC DEVICE INCLUDES A TOUCHSCREEN DISPLAY, AND THE SELECTION BY THE USER OF THE ONE PREDICTED CHATBOT PATH OF THE GRAPHICAL CHATBOT INTERFACE IS VIA THE TOUCHSCREEN DISPLAY ~610

BASED ON RECEIVING THE SELECTION BY THE USER OF ONE PREDICTED CHATBOT PATH, GENERATE A PLURALITY OF ADDITIONAL PREDICTED CHATBOT PATHS FORMING A NEW HIERARCHY OF PREDICTED CHATBOT CONTENT FOR THE USER-CHATBOT INTERACTION, AND PROVIDE FOR DISPLAY ON THE ELECTRONIC DEVICE A REVISED GRAPHICAL CHATBOT INTERFACE CONTAINING, AT LEAST IN PART, THE NEW HIERARCHY OF PREDICTED CHATBOT CONTENT FOR THE USER-CHATBOT INTERACTION ~612

BASED ON THE REVISED GRAPHICAL CHATBOT INTERFACE, RECEIVE AN ADDITIONAL USER INPUT TO THE CHATBOT VIA AN ADDITIONAL AUDIO OR TEXTUAL REQUEST, OR A PREDICTED CHATBOT PATH SELECTION FROM THE REVISED GRAPHICAL CHATBOT INTERFACE VIA THE ELECTRONIC DEVICE ~614

PROVIDE, AT LEAST IN PART, A DEPICTION OF THE USER-CHATBOT INTERACTION ON THE ELECTRONIC DEVICE CONCURRENT WITH THE GRAPHICAL CHATBOT INTERFACE WITH, AT LEAST IN PART, THE HIERARCHY OF PREDICTED CHATBOT CONTENT FOR THE USER-CHATBOT INTERACTION ~616

FIG. 6A

WHERE THE PLURALITY OF PREDICTED CHATBOT PATHS OF THE HIERARCHY OF PREDICTED CHATBOT CONTENT FOR THE USER-CHATBOT INTERACTION IS OBTAINED USING A COGNITIVE AGENT WHICH EVALUATES A KNOWLEDGE BASE TO DETERMINE, BASED AT LEAST IN PART ON THE REQUEST, THE PLURALITY OF PREDICTED CHATBOT PATHS FOR THE USER-CHATBOT INTERACTION —618

WHERE THE KNOWLEDGE BASE INCLUDES, AT LEAST IN PART, HISTORICAL DATA ON PRIOR USER INTERACTIONS WITH THE CHATBOT —620

WHERE THE COGNITIVE AGENT UTILIZES MACHINE LEARNING TO PREDICT THE PLURALITY OF PREDICTED CHATBOT PATHS FORMING THE HIERARCHY OF PREDICTED CHATBOT CONTENT FOR THE USER-CHATBOT INTERACTION —622

WHERE THE COGNITIVE AGENT EVALUATES USER COMMUNICATIONS WITH THE CHATBOT, AND POTENTIAL CHATBOT RESPONSES, TO ASCERTAIN PREDICTED CHATBOT PATHS WITH A PREDICTED CONFIDENCE LEVEL ABOVE A SET CONFIDENCE THRESHOLD TO DETERMINE THE PLURALITY OF PREDICTED CHATBOT PATHS FORMING THE HIERARCHY OF PREDICTED CHATBOT CONTENT FOR THE USER-CHATBOT INTERACTION —624

RECEIVE DATA FROM ONE OR MORE DEVICES ASSOCIATED WITH THE USER, AND USE THE DATA TO DETERMINE, AT LEAST IN PART, THE PLURALITY OF PREDICTED CHATBOT PATHS FORMING THE HIERARCHY OF PREDICTED CHATBOT CONTENT FOR THE USER-CHATBOT INTERACTION —626

WHERE THE ONE OR MORE DEVICES ASSOCIATED WITH THE USER INCLUDE ONE OR MORE INTERNET OF THINGS (IoT) DEVICES, AND THE DATA INCLUDES IoT DATA RECEIVED FROM THE ONE OR MORE IoT DEVICES —628

GRAPHICAL CHATBOT INTERFACE FACILITATING USER-CHATBOT INTERACTION

BACKGROUND

A chatbot (or smartbot, talkbot, artificial conversational entity, interactive agent, etc.) includes a computer program or artificial intelligence (AI) software that can simulate a conversation with a user in a natural language. For instance, a chatbot can conduct a conversation via auditory or textual methods through, for instance, a messaging application, a website, mobile application, or other user device. Chatbots are used in a variety of dialog systems for various practical applications, including customer service, and information acquisition. A chatbot can be accessed via a virtual assistant, or via an individual organization's application and/or website. Chatbots can be classified for use in any of a wide variety of categories.

SUMMARY

Certain shortcomings of the prior art are overcome and additional advantages are provided through the provision herein of a method of facilitating user interaction with a chatbot of a computer system. The method includes receiving, by the chatbot, a request from a user to the chatbot, where the request establishes a user-chatbot interaction. Based at least in part on the request, a plurality of predicted chatbot paths are generated forming a hierarchy of predicted chatbot content for the user-chatbot interaction. The method includes providing for display on an electronic device a graphical chatbot interface with, at least in part, the hierarchy of predicted chatbot content for the user-chatbot interaction, and receiving, via the electronic device, a selection by the user of one predicted chatbot path of the graphical chatbot interface as part of the user-chatbot interaction, where providing the graphical chatbot interface facilitates the user's interaction with the chatbot along the selected predicted chatbot path.

Computer systems and computer program products relating to one or more aspects are also described and claimed herein. Further, services relating to one or more aspects are also described and may be claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIGS. 6A-6B depict a further embodiment of processing, in accordance with one or more aspects of the present invention;

DETAILED DESCRIPTION

Aspects of the present invention and certain features, advantages and details thereof, are explained more fully below with reference to the non-limiting example(s) illustrated in the accompanying drawings. Descriptions of well-known materials, systems, devices, processing techniques, etc., are omitted so as to not unnecessarily obscure the invention in detail. It should be understood, however, that the detailed description and the specific example(s), while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular application to implement, for instance, graphical chatbot interface processing such as disclosed herein.

Figure 7:
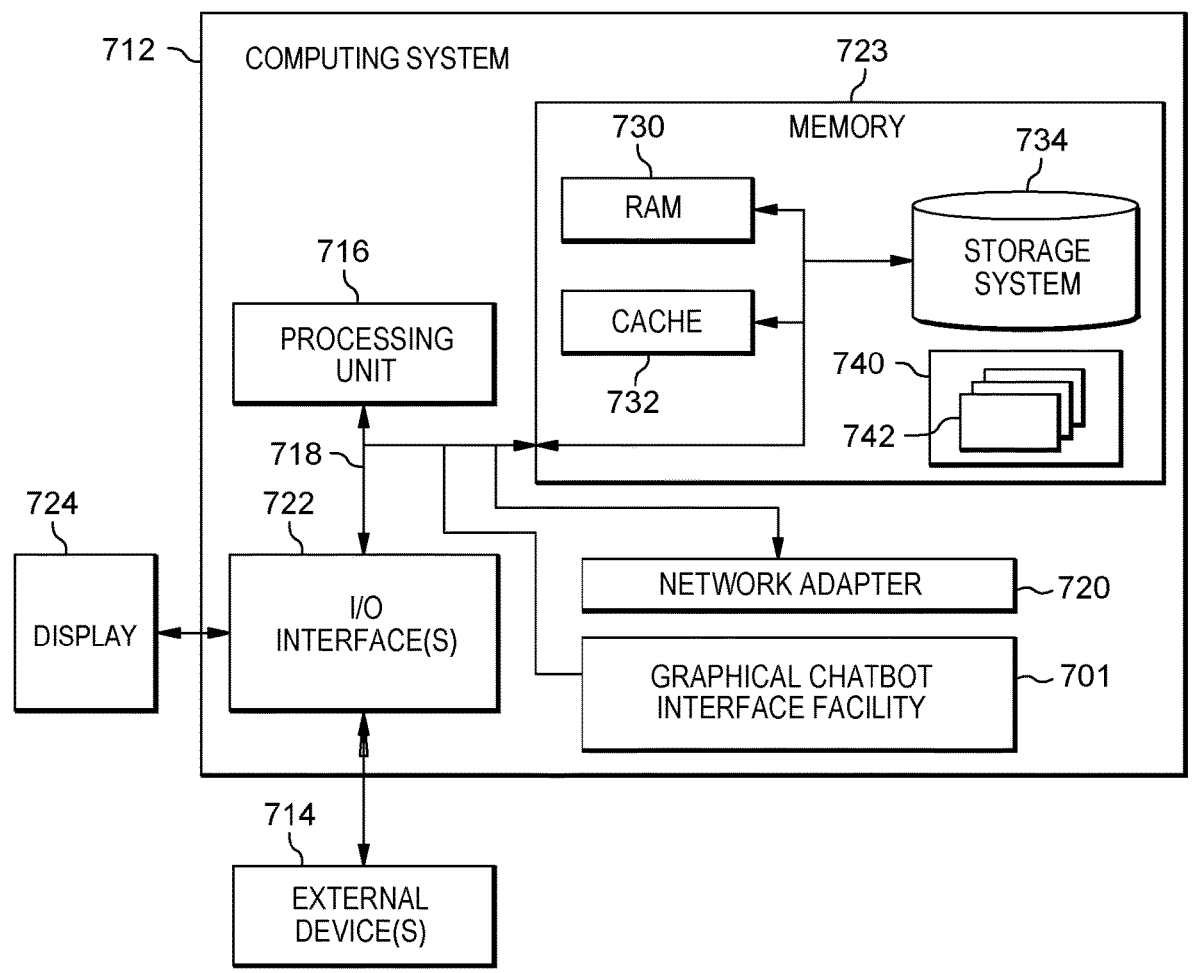
FIG. 7 depicts one embodiment of a computing system which can implement or facilitate implementing a graphical chatbot interface facility, in accordance with one or more aspects of the present invention.

As understood by one skilled in the art, program code, as referred to throughout this application, includes both software and hardware. For example, program code in certain embodiments of the present invention includes fixed function hardware, while other embodiments utilize a software-based implementation of the functionality described. Certain embodiments combine both types of program code. One example of program code, also referred to as one or more programs, is depicted in FIG. 7 as program/utility 740, having a set (at least one) of program modules 742, which can be stored in memory 723. As a further example, in FIG. 2 program code implementing one or more aspects described herein could be stored or resident within main memory 208, read-only memory 224, disk storage 226, CD-ROM 230, and/or in one or more other peripheral devices of a computing environment 200.

A chatbot, or chatbot system, includes a computer program or artificial intelligence (AI) software that simulates a conversation with a user in a natural language via auditory or textual methods. Chatbots can be integrated into interactive dialogs for various practical purposes, such as personalized service and information acquisition. Chatbot content, such as user requests or questions (input messages) and chatbot responses (output messages) that potentially could be communicated during a user-chatbot interaction can be, in one embodiment, obtained from information stored or preprogrammed into the chatbot system. Such chatbot content forms, at least in part, a knowledge base or corpus for the chatbot engine. The more comprehensive the knowledge base, the more proficient the chatbot is in addressing user requests or questions. In one or more implementations, the chatbot uses the knowledge base to request additional information from a user during a user-chatbot interaction to, for instance, fine-tune a recommended final response of the chatbot.

In one or more other implementations, the chatbot, or chatbot system, can refer to or encompass a question and answer system, which is an automatic computer system that utilizes information retrieval and natural language processing to automatically answer questions, for instance, presented in natural language. A question and answer system, for example, can perform a search of one or more knowledge bases, including online or web-based data, to provide answers to questions. In a question and answer system, the system can automatically predict a future question that a user can pose to the question/answer system, for example, in the course of a conversation or user-chatbot interaction. Prediction of future user questions and possible responses (i.e., predicted chatbot paths), can improve the process of finding a proper customized answer, and also enhance user interaction with the question and answer system.

Thus, behind each chatbot is a knowledge base or corpus that the chatbot uses, whether relatively fixed or dynamic, to for instance, respond to or request additional information from, a user during the user-chatbot interaction. Currently, there is no way to utilize the knowledge base employed by the chatbot to directly accelerate a user's pass-through the probable questions and responses in order to more efficiently arrive at a final response.

The state of the art is advanced herein by providing a method, computer system and computer program product for facilitating user interaction with a chatbot of a computer system by providing a graphical chatbot interface containing potential or predicted chatbot paths that the user-chatbot interaction is most likely to take, and allow the user to directly select or jump (via the graphical chatbot interface) to a particular predicted level or node of the predicted chatbot content during the user-chatbot interaction. In this manner, the user sees the predicted chatbot content for the current user-chatbot interaction and can make a selection via the graphical chatbot interface of a particular predicted chatbot path to accelerate the user's interaction (or conversation) with the chatbot and thereby streamline arriving at a final response desired from the chatbot.

In one or more embodiments, the predicted chatbot paths can be determined by historical chatbot interactions of the user, or other users, either in general, or as a subset of users with similar demographic, environmental, etc., backgrounds as the current user. Further, a cognitive agent, such as with machine learning, can be utilized to predict and present the predicted chatbot paths based on historical information. Also, the graphical chatbot interface facility presented can pre-generate the questions for paths with the highest probability and present these paths in a hierarchical question and answer set as the hierarchical predicted chatbot content for the user-chatbot interaction. Advantageously, the graphical chatbot interface is displayed on an electronic device for the user, which facilitates user interaction with the chatbot, and in one or more embodiments, provides an additional mode of user communication with the chatbot for the user-chatbot interaction, that is, in addition to an audio mode and/or textual mode of communication with the chatbot, depending on its implementation.

Embodiments of the present invention include a computer-implemented method, a computer system, and a computer program product where program code executing on one or more processors facilitates user interaction with a chatbot by providing a graphical chatbot interface with, at least in part, a hierarchy of predicted chatbot content for a particular user-chatbot interaction initiated by a user through a request to the chatbot. As explained herein, program code implementing graphical chatbot interface processing such as disclosed herein can be located differently in different embodiments. For instance, graphical chatbot interface processing can be implemented by a computer system implementing the chatbot, or by other computing resources implementing a cognitive agent communicatively coupled to the chatbot, or even at a user's electronic device, or a combination thereof. Further, in one or more embodiments, aspects of graphical chatbot interface processing such as disclosed herein can be implemented in a cloud-based processing environment.

More particularly, embodiments of the present invention include a computer-implemented method, a computer system, and a computer program product where program code executing on one or more processors provides graphical chatbot interface processing which includes receiving a request from a user to a chatbot, with the request establishing a user-chatbot interaction or conversation. Based at least in part on the request, a plurality of predicted chatbot paths are generated to form a hierarchy of predicted chatbot content for the user-chatbot interaction. A graphical chatbot interface is provided for display on an electronic device accessible or viewable by the user. In one embodiment, the graphical chatbot interface includes, at least in part, the hierarchy of predicted chatbot content for the user-chatbot interaction. A selection by the user of one predicted chatbot path of the plurality of predicted chatbot paths of the graphical chatbot interface is received, via the electronic device, as part of the user-chatbot interaction. The providing of the graphical chatbot interface from which the user selects a particular predicted chatbot path thus facilitates the user's interaction with the chatbot during the user-chatbot interaction by streamlining the chatbot's responses, moving the interaction along the selected predicated chatbot path as if each response/question along that predicted chatbot path had occurred.

In some embodiments of the present invention, the request is an audio request to the chatbot or a textual request to the chatbot, which constitute one mode of user communication with the chatbot for the user-chatbot interaction. Further, the graphical chatbot interface provided for display on the electronic device, and selection by the user of one predicted chatbot path, constitutes an additional mode of user communication with the chatbot for the user-chatbot interaction. In one or more embodiments, the electronic device includes a touchscreen display, and a selection by the user of the one predicted chatbot path of the plurality of predicted chatbot paths is via the touchscreen display. In one or more other embodiments, other mechanisms for user selection of a particular predicted chatbot path of the plurality of predicted chatbot paths are possible.

In some embodiments, based on receiving the selection by the user of one predicted chatbot path, a plurality of additional predicted chatbot paths is generated, forming a new hierarchy of predicted chatbot content for the user-chatbot interaction, and a revised graphical chatbot interface is provided containing, at least in part, the new hierarchy of predicted chatbot content for display on the electronic device. In one or more embodiments, based on providing the revised graphical chatbot interface, an additional user input to the chatbot can be received via an additional audio or textual request, or a predicted chatbot path selection from the revised graphical chatbot interface via the electronic device.

In one or more embodiments, the graphical chatbot interface facility provides, at least in part, a depiction of the current user-chatbot conversation on the electronic device concurrent with the graphical chatbot interface with, at least in part, the hierarchy of user-selectable, predicted chatbot content for the user-chatbot interaction.

In one or more embodiments, generating of the plurality of predicted chatbot paths of the hierarchy of predicted chatbot content for the current user-chatbot interaction includes using a cognitive agent to evaluate a knowledge base to determine, based at least in part on the request, the plurality of predicted chatbot paths.

In one embodiment, the knowledge base includes, at least in part, historical data on prior user interactions with the chatbot. Further, in one or more embodiments, the cognitive agent utilizes machine learning to predict the plurality of predicted chatbot paths forming the hierarchy of predicted chatbot content for the user-chatbot interaction. In some embodiments, the cognitive agent evaluates user communications with the chatbot, and potential chatbot responses, to ascertain predicted chatbot paths with a predicted confidence level above a set confidence threshold to determine the plurality of predicted chatbot paths forming the hierarchy of predicted chatbot content for the user-chatbot interaction.

In one or more embodiments, the graphical chatbot interface program code further receives data from one or more devices associated with the user, for instance, on one or more technical conditions of one or more user devices, and uses the received data in determining, at least in part, the plurality of predicted chatbot paths forming a current hierarchy of predicted chatbot content for the user-chatbot interaction. In one embodiment, the one or more devices associated with the user include one or more Internet of Things (IoT) devices, and the data includes IoT data received from the one or more IoT devices.

Thus, embodiments of the present invention include program code executing on one or more processors that: receives a request from a user to a chatbot which establishes a user-chatbot interaction; based at least in part on the request, generates a plurality of predicted chatbot paths, forming a hierarchy of predicted chatbot content for the user-chatbot interaction; provides for display on an electronic device a graphical chatbot interface with, at least in part, the hierarchy of predicted chatbot content for the user-chatbot interaction; and receives, via the electronic device, a selection by the user of one predicted chatbot path of the graphical chatbot interface as part of the user-chatbot interaction. Providing the graphical chatbot interface for display on the electronic device advantageously facilitates more efficient use of and interaction with the chatbot.

Aspects of various embodiments of the present invention are inextricably tied to computing and provide significant advantages over existing approaches to user interaction with a chatbot of a computer system. For instance, embodiments of the present invention enable program code executing on one or more processors to exploit interconnectivity of various systems, as well as utilize various computing-centric data analysis and handling techniques, in order to cognitively process a user's request and an available knowledge base to generate a graphical chatbot interface with, at least in part, a current hierarchy of predicted chatbot content for the initiated user-chatbot interaction. Both the interconnectivity of the computing systems utilized and the computer-exclusive data processing techniques utilized by the program code enable various aspects of the present invention. Computerized monitoring analysis techniques can also be utilized by the program code to obtain technical data associated with the user to facilitate the user-chatbot interaction, and well as to parse content and context of user communications with the chatbot, identify possible chatbot responses, and predict chatbot paths to define a hierarchy of predicted chatbot content for the user-chatbot interaction, rendering embodiments of the present invention inextricably tied to computing.

Further, embodiments of the present invention provide advantages over existing techniques for communicating with chatbots. For instance, by this disclosure, a user initiating a user-chatbot interaction is presented with a graphical chatbot interface which offers the user an opportunity to efficiently direct conversation with the chatbot through or to a particular predicted chatbot path or node, potentially jumping across one or more levels of chatbot content that would otherwise be stepwise explored during the user-chatbot conversation, thereby allowing the chatbot to arrive at a final response more quickly.

In one or more embodiments, while a user is communicating with the chatbot, chatbot program code, or a cognitive agent associated herewith, is dynamically predicting subsequent chatbot content (e.g., questions or responses to the user) to produce a set of questions and answers in a hierarchical fashion, forming an example of a graphical chatbot interface for display to the user, and from which the user can select a desired predicted chatbot path during the user-chatbot interaction. Based on the knowledge base, including the user's established interaction with the chatbot (and, in one or more embodiments, the surrounding context), the chatbot and/or cognitive agent dynamically produces a current hierarchy of predicted chatbot content with a number of question/response levels and branching of potential hierarchical navigation paths that the interaction might take. In one or more embodiments, the predicted chatbot path with a highest probability or confidence level can be highlighted for the user when the graphical chatbot interface is displayed. In one embodiment, based on the selection of a particular predicted chatbot path (or navigation path), the hierarchy of predicted chatbot content is further dynamically modified with one or more additional levels of predicted content being displayed. The graphical chatbot interface advantageously allows the user to select or traverse multiple levels or nodes of questions or answers simultaneously by selecting a particular predicted chatbot path to a particular response at a predicted level of the identified hierarchy of predicted chatbot content for the user-chatbot interaction at issue. At any point in the conversation (i.e., the user-chatbot interaction), the user can readily switch back to providing requests through the traditional chatbot communication mechanism, that is, the auditory or textual communication method of the particular chatbot system.

Figure 1:
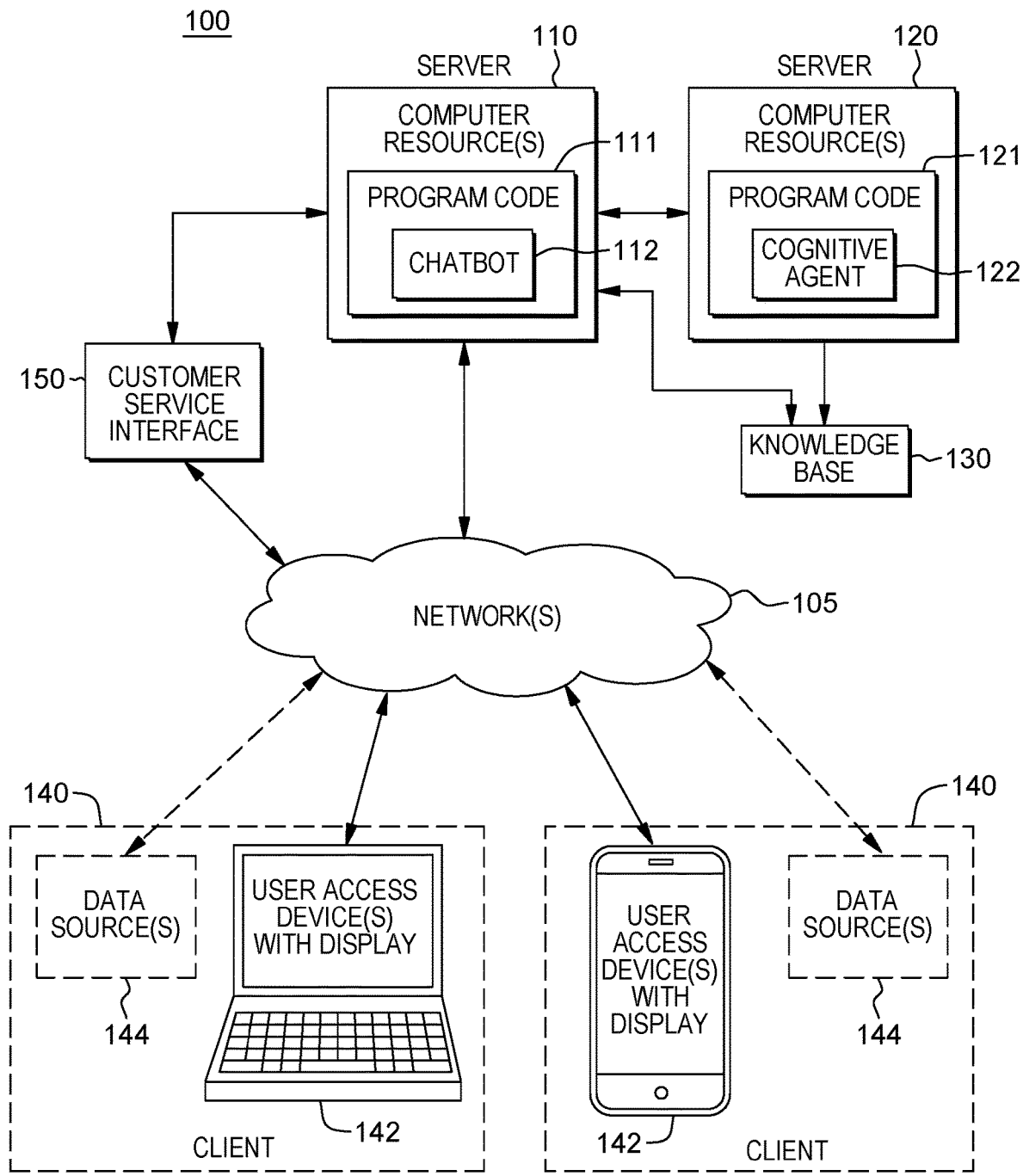
FIG. 1 is an illustration of a technical environment into which various aspects of an embodiment of a chatbot and cognitive agent in association with which a graphical chatbot interface facility can be implemented, in accordance with one or more aspects of the present invention.

By way of further explanation, FIG. 1 depicts one embodiment of an environment 100 into which various aspects of some embodiments of the present invention can be implemented or integrated. Environment 100 includes computing devices, including one or more computer resources 110 which execute program code 111 implementing one or more chatbots 112 (such as discussed herein) designed to simulate conversation with a human user via an auditory or textual method.

For illustrative purposes only, one or more other computer resources 120 are also shown with program code 121 implementing a cognitive agent 122, in accordance with one or more aspects disclosed herein. As a variation of this non-limiting example, cognitive agent 122 and chatbot 112 could share one or more computing resources. Also, in one or more other embodiments, cognitive agent 122, as well as chatbot 112 could be located elsewhere within environment 100. For instance, in one embodiment, one or more aspects could be integrated with computing resources implementing a customer service interface 150, and/or distributed, such as on one or more electronic devices 142 of one or more chatbot users. Still further, in one or more embodiments, cognitive agent 122 could be integrated as part of chatbot 112 and/or be embodied by program code executing on computer resource(s) 110.

Chatbot 112 and/or cognitive agent 122 implement, in one or more embodiments, a graphical chatbot interface facility to enhance user-chatbot interaction as disclosed herein. In one or more embodiments, chatbot 112 receives a request from a user at a location 140 via the user's electronic device 142, which establishes a user-chatbot interaction or conversation. For instance, a request can be forwarded through customer service interface 150 in communication with chatbot 112 across one or more networks 105 from electronic device 142. Based at least in part on the request, chatbot 112 and/or cognitive agent 122, which as noted, is communicatively coupled to or integrated with chatbot 112, generates a plurality of predicted chatbot paths which form an initial hierarchy of predicted chatbot content for the particular user-chatbot interaction. As part of this process, chatbot 112 and/or cognitive agent 122 references a knowledge base 130 to obtain data or content for the particular user-chatbot interaction. Knowledge base 130 can include a database of relevant chatbot content, including (in one or more embodiments) question and answer patterns for the chatbot. In one or more embodiments, chatbot 112 and/or cognitive agent 122 gathers historical chatbot information, such as questions asked by the user or other users, as well as subsequent questions based on the answer provided by the chatbot. This data collection engine aspect of the chatbot can also track various contextual situations while the user is asking a question. For instance, data sources 144 associated with a particular user initiating a user-chatbot interaction can provide technical data across network(s) 105 to chatbot 112 and/or cognitive agent 122 for subsequent storage in knowledge base 130. Further, in a question and answer system implementation, the knowledge base can include data obtained from various sources such as websites, social media, online forms, blogs, and/or others, obtained, for instance, over a communication network or a network of computers (such as the Internet) and stored in the knowledge base storage device(s).

In some embodiments of the present invention, the program code executing on the one or more resources implementing chatbot 112 and/or cognitive agent 122 utilizes existing cognitive analysis tools or agents to determine, for instance, the graphical chatbot interface with, at least in part, a hierarchy of predicted chatbot content, for the particular user-chatbot interaction at issue, and for a given stage of the interaction. Embodiments of the present invention can utilize a variety of existing cognitive agents, as well as existing APIs, to ascertain the graphical chatbot interface for display as part of the user-chatbot interaction or conversation. Some embodiments of the present invention utilize IBM Watson® as the cognitive agent. IBM Watson® is a product of International Business Machines Corporation, and is a Registered Trademark of International Business Machines Corporation, Armonk, N.Y., USA. Note that this is a non-limiting example of a cognitive agent that can be utilized in embodiments of the present invention, and is discussed for illustrative purposes only, and not to imply, implicitly or explicitly, any limitations regarding cognitive agents that can implement aspects of embodiments of the present invention.

In some embodiments of the present invention that utilize IBM Watson® as a cognitive agent, the program code interfaces with IBM Watson® APIs to perform a cognitive analysis of the request, as well as the knowledge base with reference to the request, to generate the plurality of predicted chatbot paths that form the hierarchy of predicted chatbot content that is displayed as the graphical chatbot interface. In some embodiments of the present invention, the program code interfaces with the Application Program Interfaces (APIs) that are part of a known cognitive agent, such as IBM Watson® application program interface (API), a product of International Business Machines Corporation, to determine the plurality of predicted chatbot paths, such as predicted chatbot paths with a predicted confidence level above a set confidence threshold. Further, embodiments of the present invention that utilize IBM Watson® can utilize APIs that are not part of IBM Watson® to accomplish these aspects.

As noted, in one or more embodiments, program code implementing chatbot 112 and/or cognitive agent 122 can parse content and context of a request and/or information in knowledge base 130 using natural language processing (NLP). Specifically, in some embodiments of the present invention, certain of the APIs of IBM Watson® API include a cognitive agent that includes one or more programs including, but not limited to, natural language processing, natural language classifiers, Retrieve and Rank (a service available through the IBM Watson® developer cloud that can surface the most relevant information), concepts/visual insights, trade-off analytics, text conversion, and/or relationship extraction. In an embodiment of the present invention, one or more program products analyze content and context of user requests and knowledge base information available to the chatbot and/or cognitive agent to determine the plurality of predicted chatbot paths that form the hierarchy of predicted chatbot content for the particular user-chatbot interaction. Note that various other APIs and third-party solutions can also provide the above-noted functionality in embodiments of the present invention.

Electronic device(s) 142 can be, in one or more embodiments, a user electronic device(s) that is any of a variety of electronic devices that can facilitate a user-chatbot interaction, such as disclosed herein. Electronic device(s) 142 includes a display screen on which the graphical chatbot interface with a hierarchy of predicted chatbot content for the user-chatbot interaction is to be displayed, as described herein. By way of example only, electronic device(s) 142 can be a mobile device, a smartphone, a tablet computer, a laptop computer, a personal digital assistant (PDA), a wireless computer, a desktop computer, a server, a vehicle navigation system, a gaming device, etc.

As noted, one or more networks 105 communicatively couple, for instance, computer resource(s) 110, electronic device(s) 142 and sensor(s) 144. Although not shown, computer resource(s) 110 can also communicatively couple to computer resource(s) 120 and/or knowledge base 130 or customer service interface 150 via network(s) 105, or one or more different networks. By way of example only, network(s) 105 can be or include a telecommunications network, a local area network (LAN), a wide area network (WAN), such as the Internet, or a combination thereof, and can include wired, wireless, fiber optic connections, etc. The network(s) can include one or more wired and/or wireless networks that are capable of receiving and transmitting data, including audio, textual, video, and/or graphical signals or data, depending on the implementation.

Note that, in one or more embodiments, each user or user location 140 can be uniquely identified by chatbot 112, and knowledge base 130 can include types of questions and subsequent questions and answers provided by the chatbot for that particular user or user location, as well as other users (or locations) similar in one or more characteristics to the user and/or the user's environment.

Further, with knowledge base 130 containing historical information on interactions with multiple users, the cognitive agent can identify, for instance, via a particular electronic device, which user is taking part in the user-chatbot interaction, and accordingly, the cognitive agent can better know which questions or decision points can have multiple answers for this user, thereby facilitating creation of the plurality of predicted chatbot paths that form the current hierarchy of predicted chatbot content for the particular user-chatbot interaction.

As noted, in one or more embodiments, chatbot 112 can receive user-related technical or contextual data from sensors or data sources 144, which in one or more embodiments, can be one or more Internet of Things (IoT) devices. The collected data can be received as a binary file or formatted text at the chatbot, and further, data can be transferred all at once, or in batches, as desired for a particular user-chatbot interaction. In one embodiment, the chatbot uses received data to answer questions that the user need not otherwise be prompted to provide answers to, thereby facilitating the user-chatbot interaction.

Figure 2:
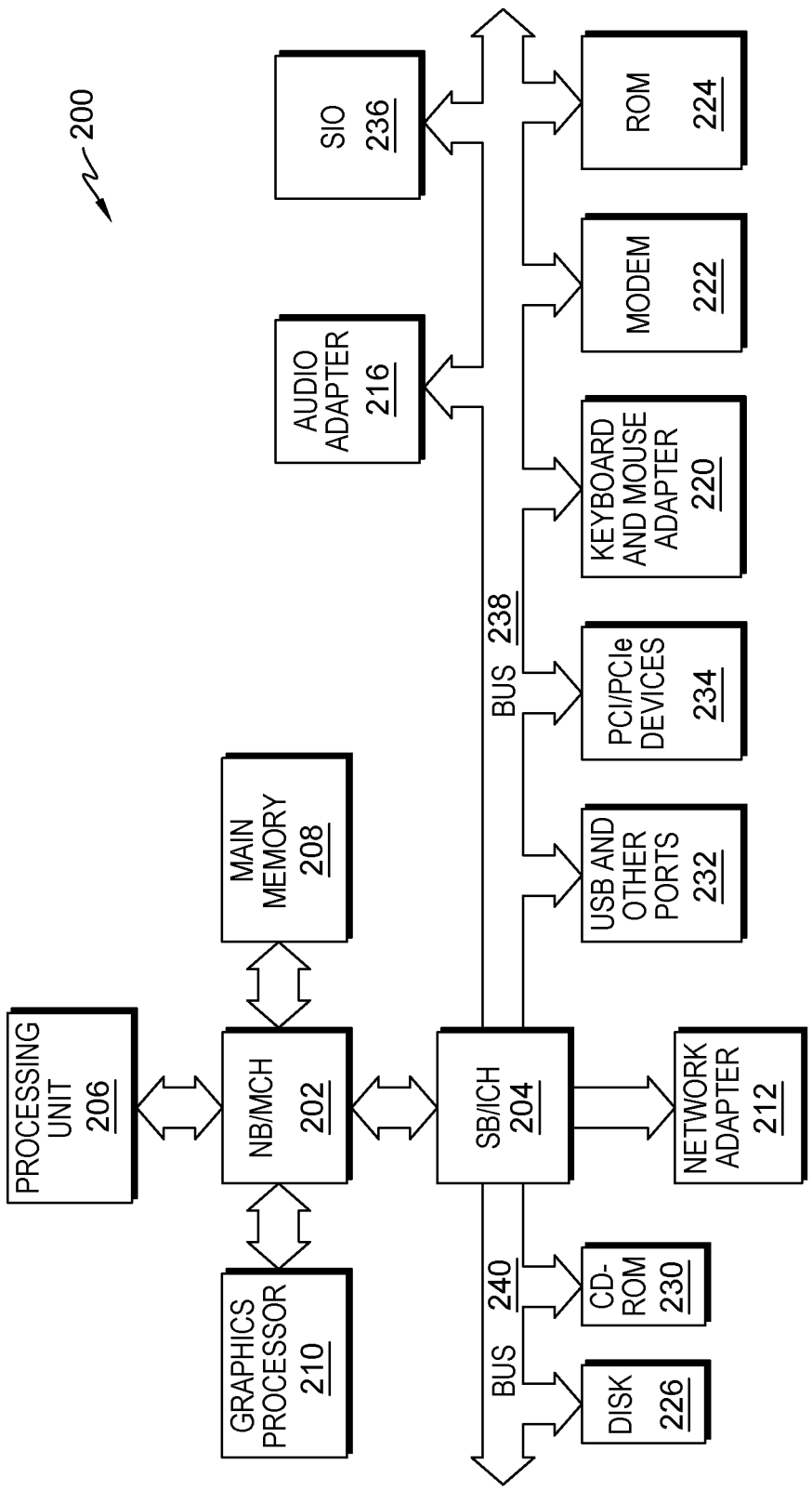
FIG. 2 is a block diagram of a data processing system into which various aspects of an embodiment of graphical chatbot interface processing can be implemented, in accordance with one or more aspects of the present invention.

Referring to FIG. 2, a block diagram of a data processing system is shown in which illustrative aspects of the present invention can be implemented. Data processing system 200 can be one example of a computer, such as server or computer resources 110, 120 or client or electronic device 142 in the system of FIG. 1, and can include computer usable program code or instructions implementing processes disclosed herein.

In the depicted example, data processing system 200 includes a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 can contain one or more processors and even can be implemented using one or more heterogeneous processor systems. Graphics processor 210 can be coupled to the NB/MCH through an accelerated graphics port (AGP), for example.

In the depicted example, a local area network (LAN) adapter 212 is coupled to south bridge and I/O controller hub 204 and audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238, and hard disk drive (HDD) 226 and CD-ROM 230 are coupled to south bridge and I/O controller hub 204 through bus 240. PCI/PCIe devices can include, for example, Ethernet adapters, add-in cards, and PC cards for notebook computers. PCI uses a card bus controller, while PCIe does not. ROM 224 can be, for example, a flash binary input/output system (BIOS). Hard disk drive 226 and CD-ROM 230 can use, for example, an integrated drive electronics (IDE) or serial advanced technology attachment (SATA) interface. A super I/O (SIO) device 236 can be coupled to south bridge and I/O controller hub 204.

An operating system runs on processing unit 206 and coordinates and provides control of various components within data processing system 200 in FIG. 2. The operating system can be a commercially available operating system. An object oriented programming system can run in conjunction with the operating system and provide calls to the operating system from programs or applications executing on data processing system 200.

Instructions for the operating system, the object-oriented programming system, and applications or programs can be located on storage devices, such as hard disk drive 226, and can be loaded into main memory 208 for execution by processing unit 206. The processes of the illustrative aspects discussed herein can be performed by processing unit 206 using computer implemented instructions, which can be located in a memory such as, for example, main memory 208, read only memory 224, or in one or more peripheral devices.

Note that the hardware embodiment depicted in FIG. 2 can vary depending on the desired implementation. Other internal hardware or peripheral devices, such as flash memory, equivalent non-volatile memory, or optical disk drives and the like, may be used in addition to or in place of certain hardware depicted. Also, the processes of the illustrative aspects described herein can be applied to other hardware environments, such as to a multiprocessor data processing system.

In one or more implementations, data processing system 200 can be an electronic device or a server computer resource, and can be generally configured with flash memory to provide non-volatile memory for storing operating system files and/or user-generated data. A bus system can include one or more buses, such as a system bus, an I/O bus and a PCI bus. Of course the bus system can be implemented using any type of communications fabric or architecture that provides for a transfer of data between different components or devices attached to the fabric or architecture. A communications unit can include one or more devices used to transmit and receive data, such as a modem or a network adapter. A memory can be, for example, main memory 208 or a cache such as found in north bridge and memory controller hub 202. A processing unit can include one or more processors or CPUs. Those skilled in the art should note that the depicted system example of FIG. 2, as well as other examples referenced herein, are not meant to imply architectural limitations. For example, as briefly noted, data processing system 200 can be implemented as part of a smartphone, a tablet computer, a laptop computer, a desktop computer, a server, a personal digital assistant (PDA), a wireless computer, a vehicle navigation system, etc.

Figure 3:
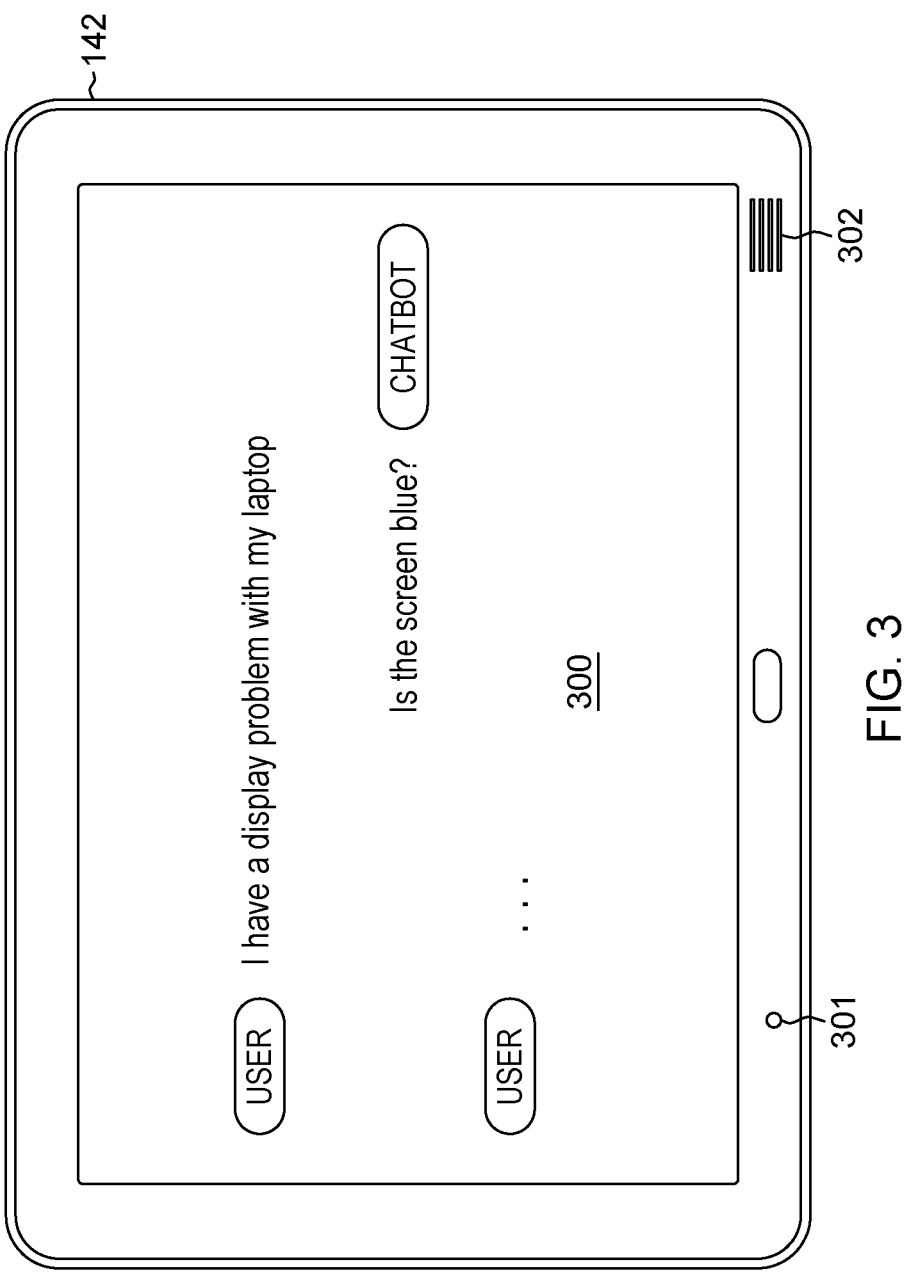
FIG. 3 depicts one embodiment of an electronic device for which various aspects of a graphical chatbot interface can be implemented, in accordance with one or more aspects of the present invention.

By way of example, FIG. 3 depicts one embodiment of electronic device 142 with display screen 300 illustrating an existing user-chatbot interaction, or conversation. Electronic device 142 includes an auditory input or microphone 301 and an auditory output or speaker 302, with (as an example) the user having initiated the interaction with the chatbot by indicating that the user has a display problem with the user's laptop computer. The chatbot responds to the user request or statement by inquiring whether the laptop computer's screen is blue. As noted, this particular response or question can be the result of the chatbot referencing a preprogrammed hierarchical knowledge base of information, used by the chatbot to fine-tune a recommended final response to the user. Alternatively, the chatbot response could be the result of a question and answer system cognitively evaluating relevant data from a knowledge base and obtaining from the data a most likely or predicted path of communication, beginning with the inquiry "Is the screen blue?" In either embodiment, the chatbot has available through the knowledge base and the cognitive agent a plurality of predicted chatbot paths for the interaction at issue, which form a hierarchy of predicted chatbot content. As noted, however, there is currently no way for the user to utilize the knowledge base or the predicted chatbot content to fast-path through the likely questions/responses in order to more efficiently arrive at a final chatbot answer.

Advantageously disclosed herein is a graphical chatbot interface facility provided for display to a user on an electronic device to allow the user to, for instance, select via a touchscreen a predicted path or node of predicted chatbot content for a particular user-chatbot interaction. The graphical chatbot interface processing disclosed allows the end user to see predicted chatbot paths that could be taken during the interaction, and select down to a particular level or response/question mode of the chatbot, where the probable chatbot paths are determined, in one or more embodiments, by historical chatbot interactions of the user and/or other users in total, or a subset of users with similar demographic and/or environmental backgrounds as the user. Further, by using machine learning to predict and present predicted chatbot content as a graphical chatbot interface, the chatbot can pre-generate questions and paths with a highest probability of being taken by the user, and present these in the format of a hierarchal question and answer set of predicted chatbot content.

Figure 4:
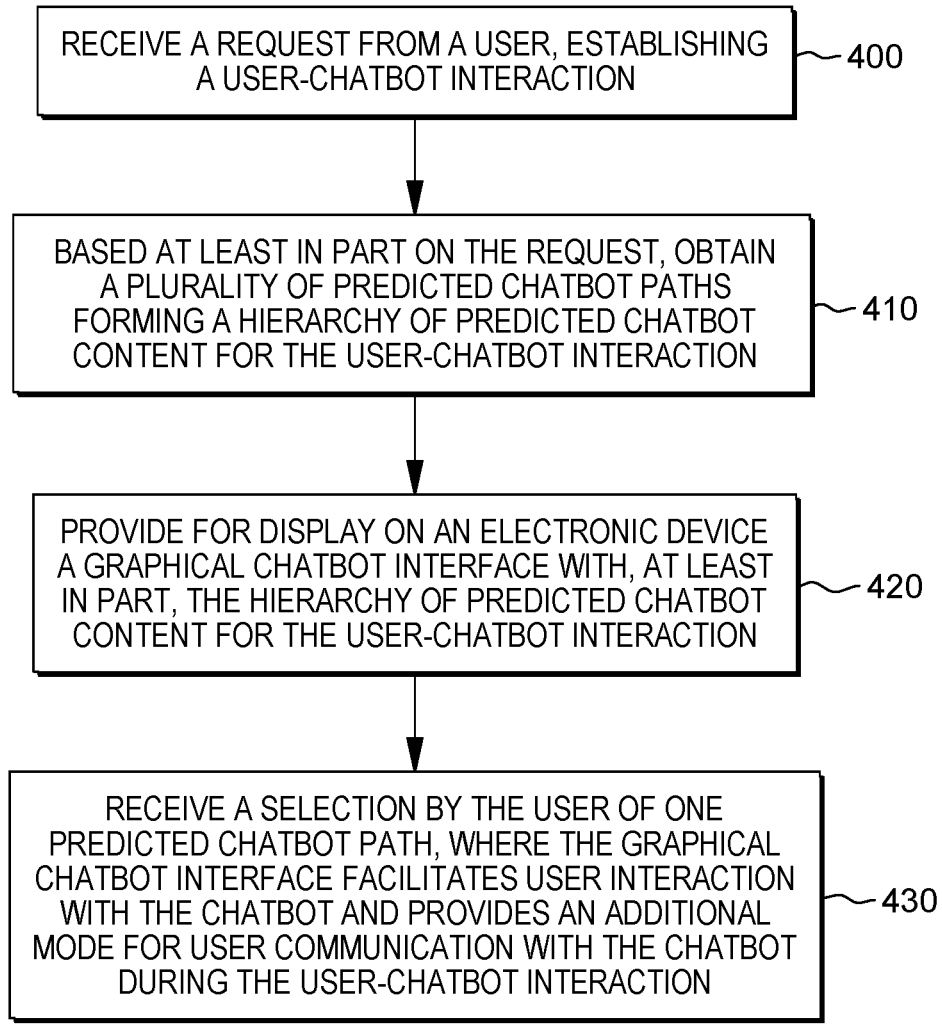
FIG. 4 depicts one embodiment of chatbot and/or cognitive agent processing, including graphical chatbot interface facility processing, in accordance with one or more aspects of the present invention.

More particularly, FIG. 4 depicts one embodiment of a process for facilitating user interaction with a chatbot of a computer system, in accordance with one or more aspects disclosed herein. As shown, a request is received from a user, which establishes a user-chatbot interaction 400. For instance, the chatbot receives a request from a user which can be or include a statement that initiates the user-chatbot interaction or conversation. Based at least in part on the request, a plurality of predicted chatbot paths forming a hierarchy of predicted chatbot content for the user-chatbot interaction is obtained 410. For instance, the predicted chatbot content can be derived from content pre-programmed into the chatbot system, and/or be or include content obtained by machine learning, as described herein.

A graphical chatbot interface is provided for display on an electronic device used by the user 420. The graphical chatbot interface includes, at least in part, the generated hierarchy of predicted chatbot content for the particular user-chatbot interaction. For instance, an initial hierarchy of predicted chatbot content can include multiple predicted chatbot paths and levels determined to be most likely for the user-chatbot interaction. A selection by the user of one particular predicted chatbot path is received, for instance, via the user selecting on a touchscreen of the electronic device the particular predicted chatbot path of interest. In this manner, the graphical chatbot interface facilitates user interaction with the chatbot, and provides an additional mode for user communication with the chatbot during the user-chatbot interaction.

In one or more embodiments, while a user is interacting with a chatbot, background artificial intelligence (AI) or cognitive agent is predicting subsequent questions/responses of the user at each user-chatbot exchange to produce a set of questions and answers in a hierarchical fashion which contains a plurality of predicted chatbot paths that form predicted chatbot content for that point in time in the conversation. This predicted chatbot content is captured by the graphical chatbot interface for display to a user-accessible electronic device in order that the user can select an appropriate hierarchical path during the interaction, and thereby, facilitate communication with the chatbot. Based on the user's interaction with the chatbot, and in one or more embodiments, the surrounding technical context, the cognitive agent can dynamically produce the appropriate level(s) and branching of the hierarchical predicted chatbot content for display as the graphical chatbot interface. Based on the selection of a particular predicted chatbot path or navigation path, the cognitive agent can further modify the predicted chatbot content, and present a revised graphical chatbot interface to the user in which further levels and/or branches of predicted chatbot paths are illustrated. The graphical chatbot interface advantageously allows the user to select multiple answers/responses to questions from the chatbot simultaneously by selecting a particular node. At any branch in the process, the user can switch back to asking questions or providing requests through the traditional method of chatbot communication, for instance, via an auditory request or a textual request.

In one or more embodiments, the graphical chatbot interface facility disclosed herein is based on predicted chatbot content for the particular user-chatbot interface based on historical interactions, either of the user with the chatbot, or of one or more other users with the chatbot. Once available, the predicted chatbot content is presented as a graphical chatbot interface for display on a user-accessible electronic device. The graphical chatbot interface can include at any given time in the interaction, the predicted chatbot paths with the highest probability of occurring for the particular user based on the user's request and/or historical interactions, allowing the user to fast-path through the chatbot knowledge base to arrive at a particular answer. Any change in the user-chatbot interaction can result in modification of the graphical chatbot interface content by reevaluating the knowledge base information.

As noted, in some embodiments, machine learning is utilized to process historically gathered interaction information, and identify a plurality of predicted chatbot paths, and accordingly, the hierarchy of predicted chatbot content for the particular use-chatbot interaction. Using machine learning, the hierarchy of predicted chatbot content can be predicted with respect to any number of question and answer patterns with the chatbot.

In one embodiment, based on the plurality of predicted chatbot paths that form the hierarchy of predicted chatbot content established for a user-chatbot interaction, as the user answers additional questions or provides additional inquiries, the chatbot and/or cognitive agent can predict a new hierarchy of predicted chatbot content for the user-chatbot interaction and provide this new content as a revised graphical chatbot interface display to the user. Thus, the processing disclosed herein is dynamic during the course of the user-chatbot interaction or conversation, and with each question asked and answered, the graphical chatbot interface can be revised. Note that the number of displayed levels in the hierarchy of predicted chatbot content can be established based, for instance, on how many subsequent questions from the user or responses from the user can be predicted based on, for instance, historical data indicative of the user's interaction with the chatbot, or other user's interaction with the chatbot. In one or more embodiments, branching of a predicted hierarchical chatbot path can be identified based on a number of predicted options that are possible and selected for display to the user as part of the graphical chatbot interface for the particular interaction. Advantageously, the user can select any displayed predicted chatbot path of the hierarchy of predicted chatbot content for the interaction, and accordingly, the chatbot responds to the user's selection. If desired, additional chatbot paths can be created to form a revised graphical chatbot interface for the user-chatbot interaction based on the user's selection. In this manner, the user can arrive at required information more quickly than in a conventional chatbot approach. Advantageously, at any point in the conversation, the user can change the request or answer, and accordingly, the chatbot and/or cognitive agent refreshes the graphical chatbot interface with newly generated predicted chatbot paths, given the current state of the conversation between the user and chatbot.

Figure 5A:
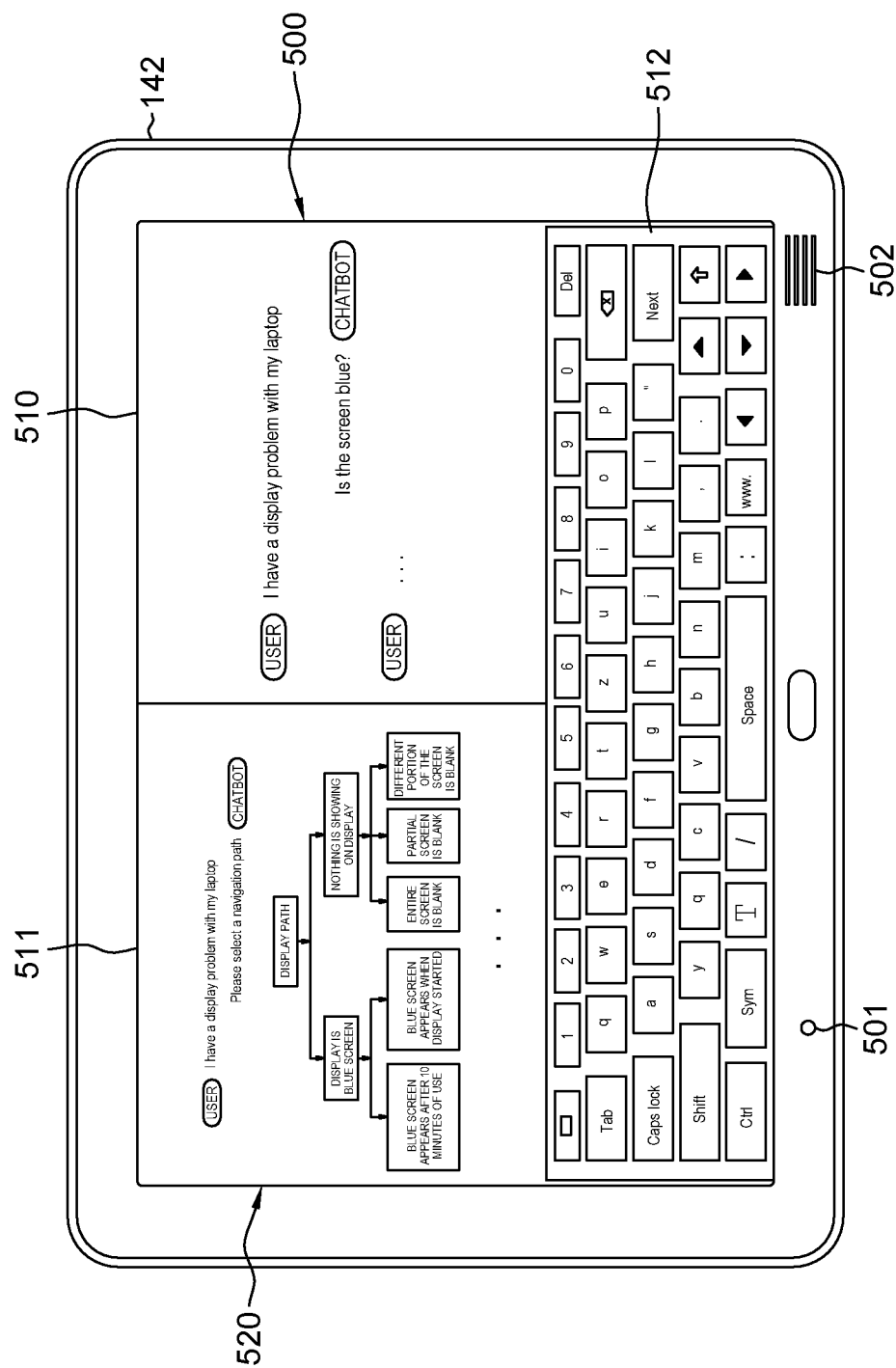
FIG. 5A depicts one embodiment of an electronic device displaying a user-chatbot interaction (or conversation) and a graphical chatbot interface with a plurality of predicted chatbot paths the a user-chatbot interaction, in accordance with one or more aspects of the present invention.
Figure 5B:
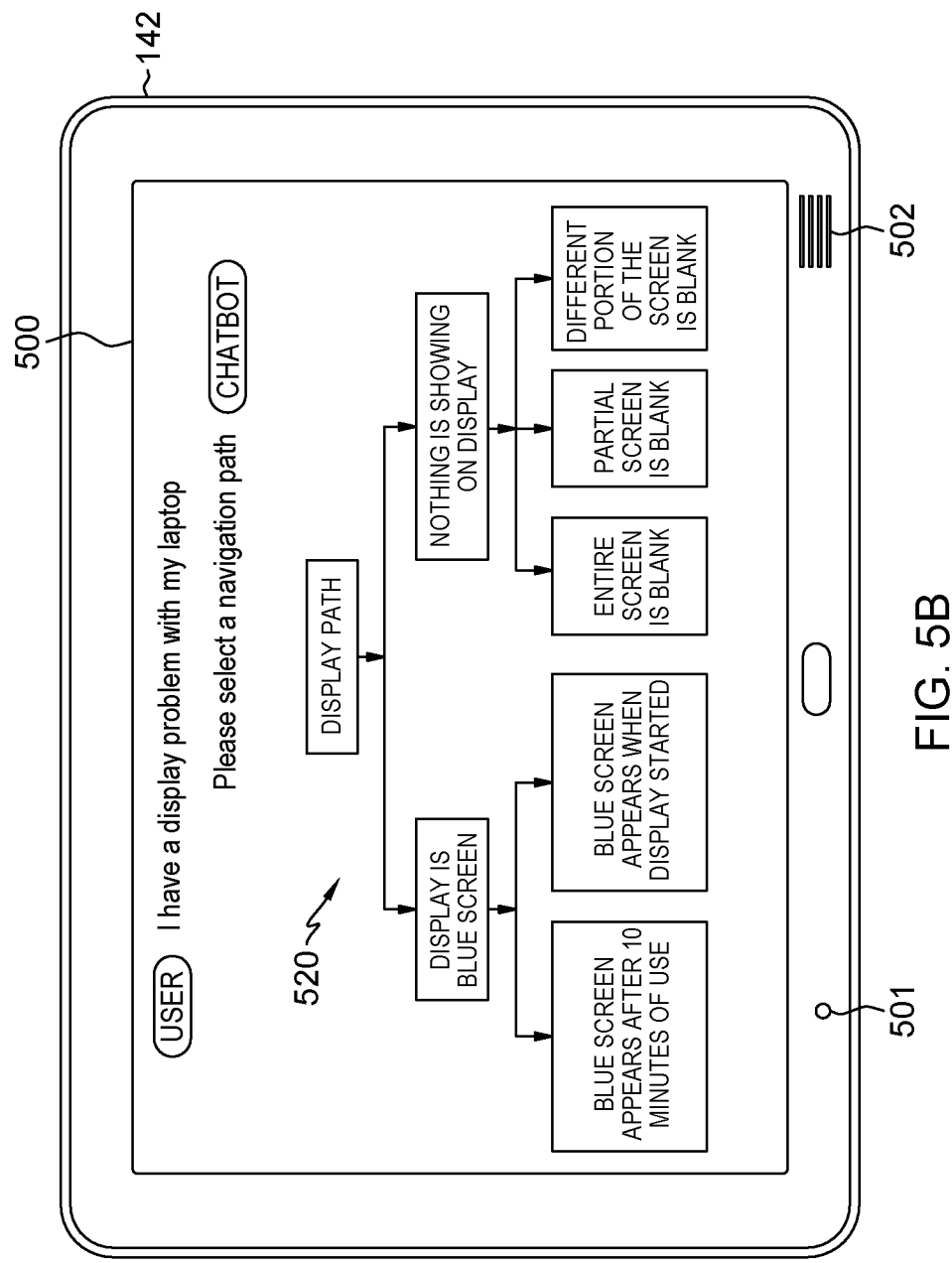
FIG. 5B depicts another embodiment of an electronic device displaying a graphical chatbot interface with a plurality of predicted chatbot paths for a user-chatbot interaction, in accordance with one or more aspects of the present invention.

FIGS. 5A & 5B depict examples of a graphical chatbot interface shown on a display of an electronic device 142 to facilitate a user's selection of a particular predicted chatbot path for the interaction.

Referring to FIG. 5A, electronic device 142 includes a display screen 500 which, in one or more embodiments, is a touchscreen display, and which includes multiple windows, including one window 510 having a depiction of the current user-chatbot interaction or conversation (similar to the depiction in FIG. 3), as well as another window 511 with a graphical chatbot interface that presents a current hierarchy of predicted chatbot content for the user-chatbot interaction, from which the user can select a particular path by contacting a particular point in the hierarchy, thus potentially jumping across multiple levels of chatbot communication to more quickly arrive at a desired answer. Further, display screen 500 includes a keyboard 512 to facilitate, for instance, a user's textual requests being input to the chatbot, as well as an audio input or microphone 511 and speaker 502, allowing for an audio communication mode with the chatbot. In this manner, the user can interact with the chatbot across multiple communication modes including, for instance, a textual input, an audio input, and selection of a particular chatbot path via the graphical chatbot interface 520.

FIG. 5B is a variation on the embodiment of FIG. 5A, wherein electronic device 142 includes touchscreen display 500 with a graphical chatbot interface 520 displayed as described herein, and including audio input 501 and speaker 502 to allow for an auditory communication mode between the user and the chatbot, as well as to allow user selection of a particular predicted chatbot path via the graphical chatbot interface 520.

As use examples, assume a user is having a problem with the user's display on a computer. The user goes to the chatbot for assistance, and to expedite the communication, the chatbot/cognitive agent provides a graphical chatbot interface with a hierarchy of predicted chatbot content for the particular user-chatbot interaction based on the user's initial request. The user can indicate that the monitor is blank, but powered ON. As a result of this input, a new hierarchy of predicted chatbot content is generated by the chatbot/cognitive agent, and a revised graphical chatbot interface is displayed to the user, from which the user can again select a particular predicted chatbot path in order to expedite communication with the chatbot.

As another example, a user is having a problem with a keyboard. The user makes a request to the chatbot, initiating a user-chatbot interaction. The chatbot understands that it has secondary predicted paths to help identify categories of problems the user is having, and the user selects via the provided graphical chatbot interface one or more options, based on which the chatbot continues processing.

Further details of one embodiment of facilitating user interaction with a chatbot of a computer system, as related to one or more aspects of the present invention, are described with reference to FIGS. 6A-6B.

Referring to FIG. 6A, in one embodiment, a method is provided which includes receiving a request from a user to a chatbot, with the request establishing a user-chatbot interaction (600). Based at least in part on the request, a plurality of predicted chatbot paths are generated, forming a hierarchy of predicted chatbot content for the user-chatbot interaction (602). A graphical chatbot interface is provided for display on an electronic device with, at least in part, the hierarchy of predicted chatbot content for the user-chatbot interaction (604). A selection by the user of one predicted chatbot path of the graphical chatbot interface is received, via the electronic device, as part of the user-chatbot interaction, where the interface facilitates user interaction with the chatbot by moving or jumping the interaction along the selected predicted chatbot path (606).

In one or more embodiments, the request is an audio request to the chatbot or a textual request to the chatbot (608), and the electronic device includes a touchscreen display, with the selection by the user of one predicted chatbot path of the graphical chatbot interface being via the touchscreen display (610).

In one or more embodiments, based on receiving a selection by the user of one predicted chatbot path, a plurality of additional predicted chatbot paths are generated, forming a new hierarchy of predicted chatbot content for the user-chatbot interaction, and a revised graphical chatbot interface is provided for display on the electronic device, with the revised graphical chatbot interface containing, at least in part, the new hierarchy of predicted chatbot content for the user-chatbot interaction (612). Based on the revised graphical chatbot interface, an additional user input to the chatbot can be received via an additional audio or textual request, or a predicted chatbot path selection from the revised graphical chatbot interface via the electronic device (614).

In one or more embodiments, a depiction of the user-chatbot interaction or conversation can be provided, at least in part, for display on the electronic device concurrent with the graphical chatbot interface with the hierarchy of predicted chatbot content for the user-chatbot interaction (616).

Referring to FIG. 6B, in one or more embodiments, the plurality of predicted chatbot paths of the hierarchy of predicted chatbot content for the user-chatbot interaction can be obtained using a cognitive agent, which evaluates a knowledge base to determine, based at least in part on the request, the plurality of predicted chatbot paths for the user-chatbot interaction (618).

In one or more implementations, the knowledge base includes, at least in part, historical data on prior user interactions with the chatbot (620). In one or more further embodiments, the cognitive agent utilizes machine learning to predict the plurality of predicted chatbot paths forming the hierarchy of predicted chatbot content for the user-chatbot interaction (622).

In one or more embodiments, the cognitive agent evaluates user communications with the chatbot, and potential chatbot responses, to ascertain predicted chatbot paths with a predicted confidence level above a set confidence threshold to determine the plurality of predicted chatbot paths forming the hierarchy of predicted chatbot content for the user-chatbot interaction (624).

In one implementation, data from one or more devices associated with the user is received and used to determine, at least in part, the plurality of predicted chatbot paths forming the hierarchy of predicted chatbot content for the user-chatbot interaction (626). In one or more implementations, the one or more devices associated with the user include one or more Internet of Things (IoT) devices, and the data includes IoT data received from the one or more IoT devices (628).

Further exemplary embodiments of a computing environment to implement one or more aspects of the present invention are described below with reference to FIGS. 7-9.

By way of further example, FIG. 7 depicts one embodiment of a computing environment 700, which includes a computing system 712. Examples of well-known computing systems, environments, and/or configurations that may be suitable for use with computer system 712 include, but are not limited to, a server, a desktop computer, a work station, a wireless computer, a handheld or laptop computer or device, a mobile phone, a programmable consumer electronic device, a tablet, a personal digital assistant (PDA), and the like.

Computing system 712 can be described in the general context of computer system-executable instructions, such as program modules, being executed by a computer system. Generally, program modules include routines, programs, objects, components, logic, data structures, and so on that perform particular tasks or implement particular abstract data types.

As depicted in FIG. 7, computing system 712, is shown in the form of a general-purpose computing device. The components of computing system 712 can include, but are not limited to, one or more processors or processing units 716, a system memory 723, and a bus 718 that couples various system components including system memory 723 to processor 716.

In one embodiment, processor 716 may be based on the z/Architecture® offered by International Business Machines Corporation, or other architectures offered by International Business Machines Corporation or other companies.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 712 can include a variety of computer system readable media. Such media may be any available media that is accessible by computing system 712, and it includes both volatile and non-volatile media, removable and non-removable media.

System memory 723 can include computer system readable media in the form of volatile memory, such as random access memory (RAM) 730 and/or cache memory 732. Computing system 712 can further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 718 by one or more data media interfaces. As described below, memory 723 can include at least one program product having a set (e.g., at least one) of program modules or code that are configured to carry out the functions of embodiments of the invention.

Program/utility 740, having a set (at least one) of program modules 742, can be stored in memory 732 by way of example, and not limitation, as well as an operating system, one or more application programs, other program modules, and program data. Each of the operating system, one or more application programs, other program modules, and program data or some combination thereof, can include an implementation of a networking environment. Program modules 742 generally carry out the functions and/or methodologies of embodiments of the invention as described herein. Alternatively, a graphical chatbot interface facility, module, logic, etc., 701 can be provided within computing environment 712 implementing chatbot and/or cognitive agent processing, as disclosed herein.

Computing system 712 can also communicate with one or more external devices 714 such as a keyboard, a pointing device, a display 724, etc.; one or more devices that enable a user to interact with computing system 712; and/or any devices (e.g., network card, modem, etc.) that enable computing system 712 to communicate with one or more other computing devices. Such communication can occur via Input/Output (I/O) interfaces 722. Still yet, computing system 712 can communicate with one or more networks such as a local area network (LAN), a general wide area network (WAN), and/or a public network (e.g., the Internet) via network adapter 720. As depicted, network adapter 720 communicates with the other components of computing system, 712, via bus 718. It should be understood that although not shown, other hardware and/or software components could be used in conjunction with computing system 712. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node can include a computer system/server, such as the one depicted in FIG. 7. Computer system/server 712 of FIG. 7 can be practiced in distributed cloud computing environments where tasks are performed by remote processing devices that are linked through a communications network. In a distributed cloud computing environment, program modules may be located in both local and remote computer system storage media including memory storage devices. Computer system/server 712 is capable of being implemented and/or performing any of the functionality set forth hereinabove.

Figure 8:
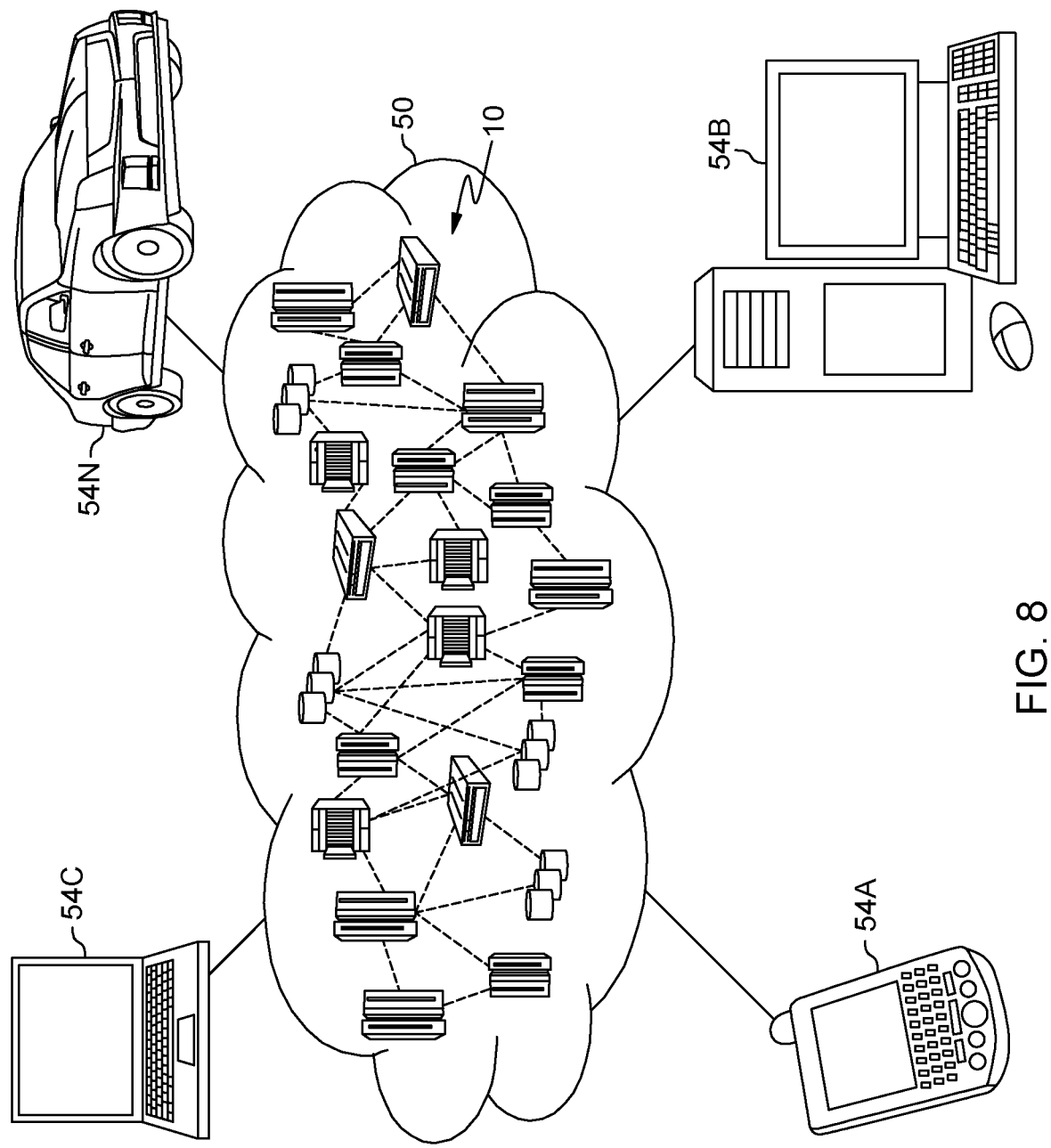
FIG. 8 depicts one embodiment of a cloud computing environment which can facilitate implementing, or be used in association with, one or more aspects of the present invention.

Referring now to FIG. 8, illustrative cloud computing environment 50 is depicted. As shown, cloud computing environment 50 can comprise one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 9:
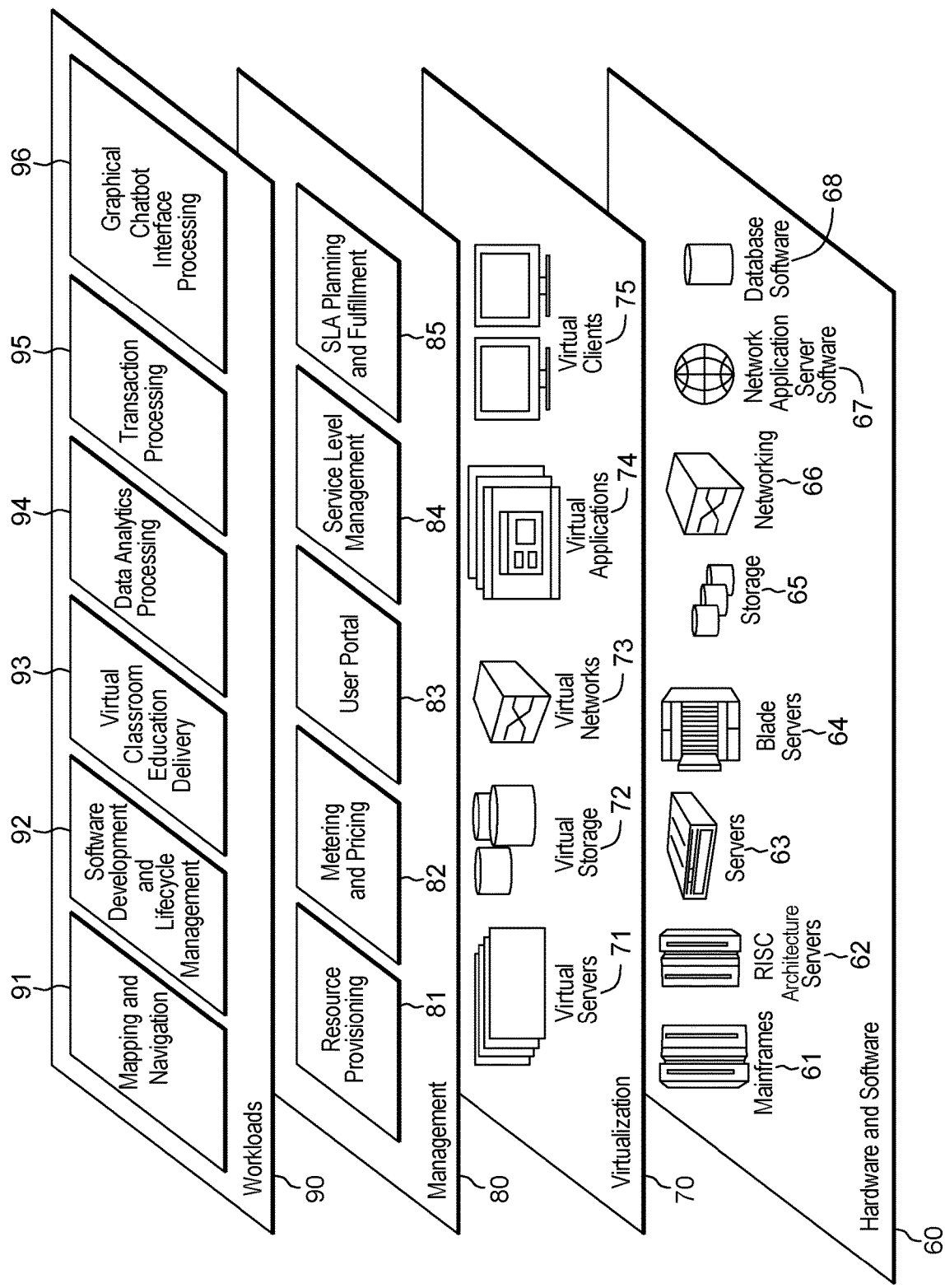
FIG. 9 depicts an example of abstraction model layers, which can facilitate implementing graphical chatbot interface processing, in accordance with one or more aspects of the present invention.

Referring to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and graphical chatbot interface processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A method of facilitating user interaction with a chatbot of a computer system, the method comprising:
   receiving a request from a user to the chatbot, the request establishing a user-chatbot interaction;
   based at least in part on the request, generating multiple levels of predictive chatbot content with a plurality of predictive chatbot paths forming a hierarchy of the multiple levels of predictive chatbot content for the user-chatbot interaction;
   providing for display on an electronic device a graphical chatbot interface with, at least in part, the hierarchy of multiple levels of predictive chatbot content for the user-chatbot interaction, wherein the multiple levels of predictive chatbot content of the hierarchy are provided for simultaneous display on the electronic device; and
   receiving, via the electronic device, a selection by the user of one predictive chatbot content level of the graphical chatbot interface as part of the user-chatbot interaction, where the selection by the user jumps the user-chatbot interaction over one or more levels of predictive chatbot content displayed in the hierarchy to facilitate the user interaction with the chatbot along a selected predictive chatbot path.

2. The method of claim 1, wherein the request is a request selected from the group consisting of an audio request to the chatbot and a textual request to the chatbot.

3. The method of claim 2, wherein the electronic device comprises a touchscreen display, and the selection by the user of the one predictive chatbot content level of the graphical chatbot interface is via the touchscreen display.

4. The method of claim 3, further comprising, based on the receiving of the selection by the user of one predictive chatbot content level, generating a plurality of additional predictive chatbot paths forming a new hierarchy of multiple levels of predictive chatbot content for the user-chatbot interaction, and providing for display on the electronic device a revised graphical chatbot interface containing, at least in part, the new hierarchy of multiple levels of predictive chatbot content for the user-chatbot interaction.

5. The method of claim 4, wherein based on providing the revised graphical chatbot interface, receiving an additional user input to the chatbot via an additional audio or textual request, or a predictive chatbot path selection from the revised graphical chatbot interface via the electronic device.

6. The method of claim 1, further comprising providing, at least in part, a depiction of the user-chatbot interaction on the electronic device concurrent with the graphical chatbot interface with, at least in part, the hierarchy of multiple levels of predictive chatbot content for the user-chatbot interaction.

7. The method of claim 1, wherein the generating of the plurality of predictive chatbot paths of the hierarchy of predictive chatbot content for the user-chatbot interaction comprises using a cognitive agent to evaluate a knowledge base to determine, based at least in part on the request, the plurality of predictive chatbot paths for the user-chatbot interaction.

8. The method of claim 7, wherein the knowledge base comprises, at least in part, historical data on prior user interactions with the chatbot.

9. The method of claim 7, wherein the cognitive agent utilizes machine learning to predict the plurality of predictive chatbot paths forming the hierarchy of multiple levels of predictive chatbot content for the user-chatbot interaction.

10. The method of claim 7, wherein the cognitive agent evaluates user communications with the chatbot, and potential chatbot responses, to ascertain predictive chatbot paths with a predicted confidence level above a set confidence threshold to determine the plurality of predictive chatbot paths forming the hierarchy of multiple levels of predictive chatbot content for the user-chatbot interaction.

11. The method of claim 1, further comprising, receiving data from one or more devices associated with the user, and using the data in determining, at least in part, the plurality of predictive chatbot paths forming the hierarchy of multiple levels of predictive chatbot content for the user-chatbot interaction.

12. The method of claim 11, wherein the one or more devices associated with the user comprise one or more Internet of Things (IoT) devices, and the data comprises IoT data received from the one or more IoT devices.

13. A computer system comprising:
    a memory; and
    one or more processors in communication with the memory, wherein the computer system is configured to perform a method comprising:
      receiving a request from a user to the chatbot, the request establishing a user-chatbot interaction;
      based at least in part on the request, generating multiple levels of predictive chatbot content with a plurality of predictive chatbot paths forming a hierarchy of the multiple levels of predictive chatbot content for the user-chatbot interaction;
      providing for display on an electronic device a graphical chatbot interface with, at least in part, the hierarchy of multiple levels of predictive chatbot content for the user-chatbot interaction, wherein the multiple levels of predictive chatbot content of the hierarchy are provided for simultaneous display on the electronic device; and
      receiving, via the electronic device, a selection by the user of one predictive chatbot content level of the graphical chatbot interface as part of the user-chatbot interaction, where the selection by the user jumps the user-chatbot interaction over one or more levels of predictive chatbot content displayed in the hierarchy to facilitate the user interaction with the chatbot along a selected predictive chatbot path.

14. The computer system of claim 13, wherein the request is a request selected from the group consisting of an audio request to the chatbot and a textual request to the chatbot, the electronic device comprises a touchscreen display, and the selection by the user of the one predictive chatbot path of the graphical chatbot interface is via the touchscreen display.

15. The computer system of claim 14, further comprising, based on the receiving of the selection by the user of one predictive chatbot content level, generating a plurality of additional predictive chatbot paths forming a new hierarchy of multiple levels of predictive chatbot content for the user-chatbot interaction, and providing for display on the display device a revised graphical interface containing, at least in part, the new hierarchy of predicted multiple levels of predictive chatbot content for the user-chatbot interaction.

16. The computer system of claim 13, wherein the generating of the plurality of predictive chatbot paths of the hierarchy of multiple levels of predictive chatbot content for the user-chatbot interaction comprises using a cognitive agent to evaluate a knowledge base to determine, based at least in part on the request, the plurality of predictive chatbot paths for the user-chatbot interaction.

17. The computer system of claim 16, wherein the cognitive agent utilizes machine learning to predict the plurality of predictive chatbot paths forming the hierarchy of multiple levels of predictive chatbot content for the user-chatbot interaction.

18. The computer system of claim 16, wherein the cognitive agent evaluates user communications with the chatbot, and potential chatbot responses, to ascertain predictive chatbot paths with a predicted confidence level above a set confidence threshold to determine the plurality of predictive chatbot paths forming the hierarchy of multiple levels of predictive chatbot content for the user-chatbot interaction.

19. A computer program product comprising:
   a computer-readable storage medium readable by one or more processing circuits and storing instructions for execution by the one or more processing circuits for performing a method comprising:
      receiving a request from a user to the chatbot, the request establishing a user-chatbot interaction;
      based at least in part on the request, generating multiple levels of predictive chatbot content with a plurality of predictive chatbot paths forming a hierarchy of the multiple levels of predictive chatbot content for the user-chatbot interaction;
      providing for display on an electronic device a graphical chatbot interface with, at least in part, the hierarchy of multiple levels of predictive chatbot content for the user-chatbot interaction, wherein the multiple levels of predictive chatbot content of the hierarchy are provided for simultaneous display on the electronic device; and
      receiving, via the electronic device, a selection by the user of one predictive chatbot content level of the graphical chatbot interface as part of the user-chatbot interaction, where the selection by the user jumps the user-chatbot interaction over one or more levels of predictive chatbot content displayed in the hierarchy to facilitate the user interaction with the chatbot along a selected predictive chatbot path.

20. The computer program product of claim 19, wherein the generating of the plurality of predictive chatbot paths of the hierarchy of multiple levels of predictive chatbot content for the user-chatbot interaction comprises using a cognitive agent to evaluate a knowledge base to determine, based at least in part on the request, the plurality of predictive chatbot paths for the user-chatbot interaction, and wherein the cognitive agent evaluates user communications with the chatbot, and potential chatbot responses, to ascertain predictive chatbot paths with a predicted confidence level above a set confidence threshold to determine the plurality of predictive chatbot paths forming the hierarchy of multiple levels of predictive chatbot content for the user-chatbot interaction.

* * * * *